(12) United States Patent
Carr (10) Patent No.: US 7,626,707 B2
(45) Date of Patent: Dec. 1, 2009

(54) DUAL CAVITY DISPLACEMENT SENSOR

(75) Inventor: Dustin Wade Carr, Albuquerque, NM (US)

(73) Assignee: Symphony Acoustics, Inc., Rio Rancho, NM (US)

( * ) Notice: Subject to any disclaimer, the term of this patent is extended or adjusted under 35 U.S.C. 154(b) by 226 days.

(21) Appl. No.: 11/927,234

(22) Filed: Oct. 29, 2007

(65) Prior Publication Data

US 2009/0109423 A1    Apr. 30, 2009

(51) Int. Cl.
*G01B 9/02* (2006.01)
*G01B 11/02* (2006.01)

(52) U.S. Cl. .................................. 356/519; 356/506
(58) Field of Classification Search ............... 356/480, 356/454, 519, 505, 506
See application file for complete search history.

(56) References Cited

U.S. PATENT DOCUMENTS

| | | | |
|---|---|---|---|
| 4,983,824 A | 1/1991 | Saaski et al. | |
| 5,128,537 A | 7/1992 | Halg | |
| 5,589,689 A | 12/1996 | Koskinen | |
| 5,831,262 A | 11/1998 | Greywall et al. | |
| 5,832,157 A | 11/1998 | Berthold et al. | |
| 5,909,280 A | 6/1999 | Zavracky | |
| 5,986,759 A | 11/1999 | DeCain et al. | |
| 6,163,380 A | 12/2000 | Hays | |
| 6,321,010 B1 | 11/2001 | Walker et al. | |
| 6,483,619 B1 | 11/2002 | Greywall | |
| 6,567,572 B2 | 5/2003 | Degertekin et al. | |
| 7,355,723 B2 * | 4/2008 | Carr | 356/519 |
| 7,359,067 B2 * | 4/2008 | Carr | 356/519 |
| 7,495,775 B2 * | 2/2009 | Carr | 356/519 |
| 7,551,295 B2 * | 6/2009 | Carr et al. | 356/506 |
| 2003/0038949 A1 | 2/2003 | Degertekin et al. | |
| 2004/0099799 A1 | 5/2004 | Shinzou | |
| 2004/0130728 A1 | 7/2004 | Degertekin et al. | |
| 2005/0018541 A1 | 1/2005 | Johansen et al. | |
| 2005/0105098 A1 | 5/2005 | Johansen et al. | |
| 2005/0231729 A1 | 10/2005 | Lopushansky et al. | |
| 2007/0206202 A1 * | 9/2007 | Carr | 356/519 |
| 2007/0236704 A1 * | 10/2007 | Carr | 356/519 |
| 2007/0279640 A1 * | 12/2007 | Carr et al. | 356/519 |
| 2008/0151348 A1 * | 6/2008 | Carr | 359/239 |
| 2008/0163686 A1 * | 7/2008 | Carr | 73/514.26 |
| 2009/0109445 A1 * | 4/2009 | Carr et al. | 356/519 |

FOREIGN PATENT DOCUMENTS

GB    1 234 659 A    8/1971

OTHER PUBLICATIONS

Sagberg, et al., Optical Microphone Based on a Modulated Diffractive Lens, IEEE Photonics Technology Letters, vol. 15, No. 10, Oct. 2003, pp. 1431-1433.

* cited by examiner

*Primary Examiner*—Patrick J Connolly
(74) *Attorney, Agent, or Firm*—DeMont & Breyer, LLC (57) ABSTRACT

An optical displacement sensor is disclosed comprising a beam splitter having two optically coupled and mechanically coupled optically resonant cavities. The respective cavity lengths of the optically resonant cavities are functions of an environmental stimulus. By virtue of the optically coupled optically resonant cavities, the output of the beam splitter is less sensitive to input wavelength variation yet retains high sensitivity to the environmental stimulus.

17 Claims, 8 Drawing Sheets

DUAL CAVITY DISPLACEMENT SENSOR

CROSS REFERENCE TO RELATED APPLICATIONS

The underlying concepts, but not necessarily the language, of the following cases are incorporated by reference:
(1) U.S. patent application Ser. No. 11/366,730, filed 2 Mar. 2006; and
(2) U.S. patent application Ser. No. 11/421,593 filed 22 Mar. 2007.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to displacement sensors in general, and, more particularly, to optical displacement sensors.

BACKGROUND OF THE INVENTION

Displacement sensors, such as microphones, accelerometers, and pressure sensors, are well-known. Displacement sensors based on capacitive, impedance, and optical measurements have been developed. Optical displacement sensors are particularly attractive as they overcome many of the limitations of capacitive and impedance measurement techniques, such as low sensitivity, the need for high voltage biasing, poor electrical isolation, or response nonlinearities.

Many optical displacement sensors known in the prior art operate by detecting light reflected by an optical element that changes its reflectivity in response to an environmental stimulus, such as pressure differential, acceleration, sound, vibration, etc. A Fabry-Perot interferometer has often been used as such an optical element.

A Fabry-Perot interferometer is an optical element that comprises an optical cavity that is optically resonant for one or more wavelengths of light. A Fabry-Perot interferometer is an optical beam splitter that can receive input light and distribute it between a first output, which is reflected from the interferometer, and a second output, which is transmitted through the interferometer. The distribution of the light into these two outputs is a function of the wavelength of the input light and a variable spacing between two parallel partially-reflective surfaces that define the optically resonant cavity.

In order to form a Fabry-Perot interferometer that is sensitive to an environmental stimulus, one surface of the Fabry-Perot interferometer is a surface of a movable membrane that moves in response to the stimulus. When the movable membrane moves in response to incident sound, for example, the distribution of light between the two outputs is changed. As a result, the intensity of each of the outputs is changed. As a result, detection of one or both of these outputs by a photo-detector results in an electrical signal that is a function of the acoustic energy of the incident sound.

The input light is typically generated by a coherent light source, such as a laser or LED. Such light sources are known to exhibit wavelength fluctuations due to, for example, temperature variations, drive current fluctuations, or aging. Because the response of a conventional Fabry-Perot interferometer is a function of both membrane motion and input wavelength, it can be difficult to differentiate a desired environmentally induced response from fluctuation of the wavelength of the input light. As a result, input light wavelength fluctuation represents a source of noise for the displacement sensor and reduces its sensitivity and performance. Wavelength stabilization can be used to ensure that the wavelength of the input light to the Fabry Perot interferometer remains stable. Wavelength stabilization, however, increases the complexity of the light source and can be quite expensive to implement.

An optical beam splitter that has low sensitivity to wavelength changes but also exhibits high sensitivity to an environmental stimulus would enable an optical displacement sensor having the potential for, among other things, higher sensitivity, improved signal to noise ratio, and lower cost.

SUMMARY OF THE INVENTION

The present invention enables detection of an environmental stimulus without some of the costs and disadvantages of the prior art. The present invention provides an optical displacement sensor that comprises a beam splitter that: (1) is capable of high sensitivity response to an environmental stimulus; and (2) exhibits low sensitivity to wavelength fluctuations of the input light on which it operates. Embodiments of the present invention are particularly well-suited for use in microphone, pressure sensor, vibration sensor, and accelerometer applications.

Fabry-Perot interferometer-based beam-splitters known in the prior art employ a single optically resonant cavity that distributes input light into a reflected output and a transmitted output. The distribution of optical energy between the two outputs is a function of the cavity length and the wavelength of the input light. These beam-splitters exhibit substantially equal sensitivities to cavity length changes and wavelength fluctuations. Wavelength changes, therefore, translate into noise on the output signals.

In similar fashion to prior-art displacement sensors, embodiments of the present invention comprise a beam-splitter that distributes input light into a reflected output and a transmitted output. In contrast to the prior-art, the beam splitter of the present invention comprises a pair of optically resonant cavities that are optically coupled. As a result, the reflected and transmitted outputs are each a "composite" output of both cavities. In addition, the two optically resonant cavities are mechanically coupled so that their cavity lengths are affected by the environmental stimulus in complimentary fashion. In other words, a decrease in one cavity length leads to a commensurate increase in the other cavity length (i.e., the sum of the two cavity lengths remains substantially constant). In contrast to prior-art beam splitters that comprise a single optically resonant cavity, the composite operation of the optically resonant cavities of the present invention provides an optical output that has greater sensitivity to motion of the membrane than to wavelength fluctuations of the input light.

Embodiments of the present invention comprise a first and second mirror, each of which is partially reflective for the input light. These mirrors are interposed by a membrane that is movable in response to the environmental stimulus. The membrane comprises a first and second surface, each of which is a partially reflective mirror for the input light. The first optically resonant cavity is defined by the first mirror and the first surface. The second optically resonant cavity is defined by the second mirror and the second surface. Since the membrane moves in response to the environmental stimulus, the cavity length of each of the optically resonant cavities is a function of the environmental stimulus.

For a conventional prior-art beam splitter, wavelength fluctuations in the input light translate into noise in the output signals. These wavelength fluctuations, therefore, degrade the signal-to-noise ratio (SNR) of the displacement sensor. In contrast to prior-art beam splitters, the present invention can be operated at operating points that are substantially insensitive to changes in the wavelength of the input light—without a commensurate degradation in sensor responsivity. As a result, the SNR attainable for a displacement sensor in accordance with the present invention is improved over that attainable for displacement sensors that comprise a single optically resonant cavity.

An embodiment of the present invention comprises: (a) a first surface, (b) a second surface, and (c) a movable membrane, wherein the movable membrane interposes the first surface and the second surface; wherein the first surface and the membrane are substantially parallel and form a first optically resonant cavity having a first cavity length, and wherein the first cavity length varies in response to an environmental stimulus; wherein the second surface and the membrane are substantially parallel and form a second optically resonant cavity having a second cavity length, and wherein the second cavity length varies in response to the environmental stimulus; and wherein the ratio of optical energy in the first output to the optical energy in the second output is a function of the first cavity length and the second cavity length.

DETAILED DESCRIPTION

The following terms are defined for use in this Specification, including the appended claims:

Fabry-Perot etalon means an optically-resonant cavity formed by two substantially parallel and substantially flat surfaces that are separated by a cavity length, wherein the cavity length is fixed.

Fabry-Perot interferometer means an optically-resonant cavity formed by two substantially parallel and substantially flat surfaces that are separated by a cavity length, wherein the cavity length is not fixed. Examples include arrangements of plates wherein the cavity length is controllably-varied using an actuator, as well as arrangements wherein the cavity length can vary in response to a stimulus, such as incident acoustic energy.

Cavity length means the instantaneous separation between two surfaces that form an optically-resonant cavity. Cavity length is fixed in the case of an optically-resonant etalon. Cavity length is variable in the case of an interferometer, such as a Fabry-Perot interferometer.

Reflected means reflected externally to an element. A beam reflected by an element, for example, undergoes a change in propagation direction, due to interaction with the element, of at least 90 degrees. It does NOT mean energy that reflects internally within the element. For example, reflected energy from an optically-resonant cavity means light reflected away from a surface of the cavity, not light reflecting between the two surfaces that form the cavity.

Transmitted means not reflected externally to or absorbed by an element. A transmitted beam undergoes a change in propagation direction of less than 90 degrees after interaction with the element. Examples of transmitted beams include, without limitation: a light beam that passes completely through a lens, dielectric layer, or material; a light beam that is refracted by a prism; and, light that passes through at least one surface that forms an optically-resonant cavity.

Mechanically-coupled means that one device is linked to another device such that movement of the one device affects the other device. For example, a motor and a mirror are mechanically-coupled if actuation of the motor causes motion of the mirror. This could be through direct contact, as in the case of two physically-coupled devices (e.g., a mirror that is mounted on a linear-motor); or through an intermediate medium (e.g., a mirror that is moved via a hydraulic force that is generated by a motor).

Figure 1:
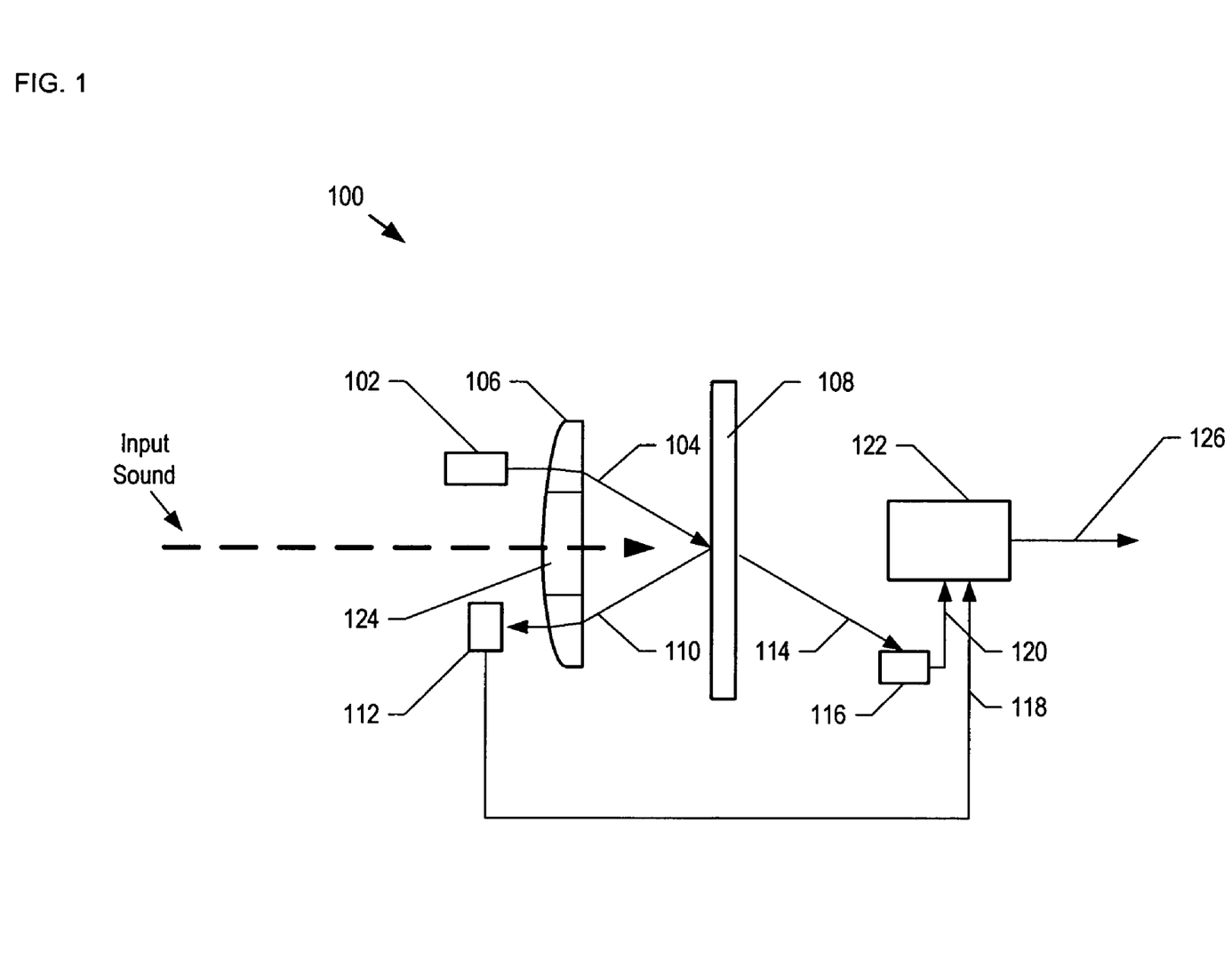
FIG. 1 depicts a schematic diagram of details of a displacement sensor in accordance with an illustrative embodiment of the present invention.

FIG. 1 depicts a schematic diagram of details of a displacement sensor in accordance with an illustrative embodiment of the present invention. Displacement sensor 100 comprises source 102, lens 106, beam splitter 108, detector 112, detector 116, and processor 122. Displacement sensor 100 is a microphone that converts received acoustic energy into output electrical signal 126. In some embodiments, displacement sensor 100 converts another form of energy, such as mechanical, thermal, chemical, nuclear, and the like, into an output electrical signal.

Source 102 is a laser diode capable of emitting monochromatic light at 850 nanometers (nm) with a spectral-width of less than ten (10) nanometers, and preferably less than three (3) nanometers. In some embodiments of the present invention, source 102 comprises a light-emitting diode. In still some other embodiments, source 102 comprises a super-luminescent light-emitting diode. In still some other embodiments of the present invention, source 102 comprises a narrow-wavelength-band filter that reduces the spectral bandwidth of source 102.

Lens 106 is a plano-convex lens that is suitable for collimating light emitted by a source 102 in well-known fashion. Lens 106 includes access hole 124, which facilitates the propagation of acoustic energy toward beam splitter 108. In some embodiments, lens 106 does not include access hole 124. Lens 106 is aligned to source 102 such that the output of source 102 is received off the central axis of lens 106. Lens 106 collimates the output of source 102 into input beam 104 and directs input beam 104 toward the focal point of lens 106. Lens 106 also receives reflected beam 110 from beam splitter 108 and focuses the optical energy of reflected beam 110 toward detector 112. The configuration of lens 106, with respect to source 102, beam splitter 108, and detector 112, is often referred to as a "pupil-division" configuration.

In some embodiments of the present invention, lens 106 is not present. In these embodiments, source 102 comprises a collimating lens and a non-orthogonal angle is formed by the direction of propagation of the output of source 102 and beam splitter 108.

Beam splitter 108 is a variable-reflectivity optical element that comprises two optically resonant cavities that are mechanically coupled. Beam splitter 108 is described in more detail below and with respect to FIG. 4. Beam splitter 108 receives input beam 104 and splits it into reflected beam 110 and transmitted beam 114. The ratio of optical energy in reflected beam 110 and transmitted beam 114 is a function of the response of beam splitter 108 to an environmental stimulus (i.e., input sound).

Detectors 112 and 116 are photodetectors sensitive to the wavelength of the light output by source 102. Each of detectors 112 and 116 measure the intensity of the light that is incident on it and transmits an electrical signal indicative of that intensity to processor 122. Detector 112 receives reflected beam 110 and detector 116 receives transmitted beam 114.

Processor 122 is a general-purpose processor that is capable of reading data and instructions from a memory, of executing instructions, of writing data to a memory, of receiving data from detectors 112 and 116, and of providing output electrical signal 126. Processor 122 receives electrical signals 118 and 120 and performs signal processing based on those signals.

Figure 2:
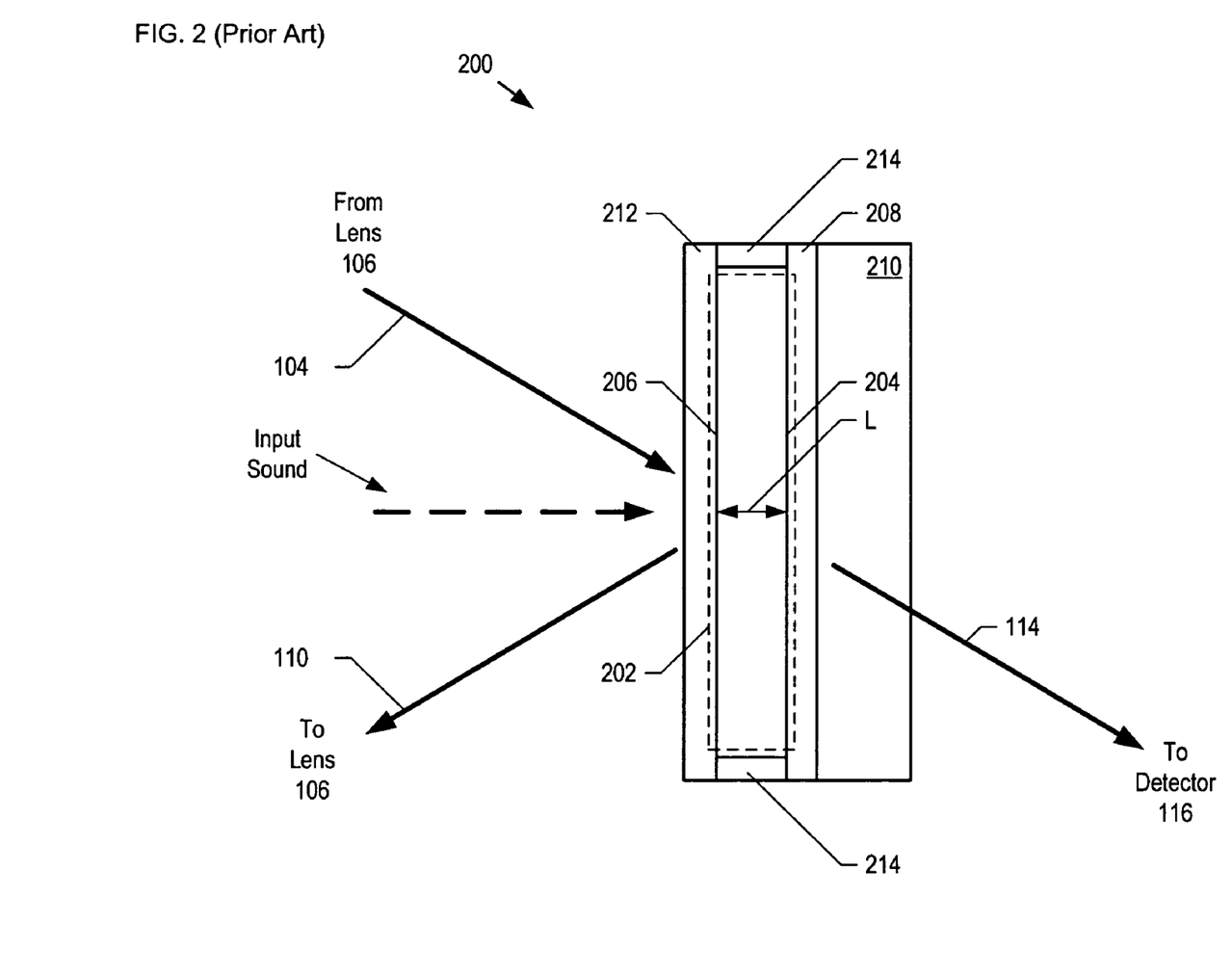
FIG. 2 depicts a cross-sectional view of details of a representative prior-art beam splitter.

FIG. 2 depicts a cross-sectional view of details of a representative prior-art beam splitter. Fabry-Perot interferometer 200 comprises optically resonant cavity 202, which is defined by two partially-reflective surfaces (i.e., surfaces 204 and 206) that are separated from one another by cavity length L.

Fabry-Perot interferometer 200 receives input beam 104 from lens 106 and splits the optical energy of input beam 104 into reflected beam 110 and transmitted beam 114. The ratio of optical energy in reflected beam 110 and transmitted beam 114 is dependent upon the wavelength of input beam 104 and cavity length L. Surface 204 is a surface of mirror layer 208, which is disposed on substrate 210. In similar fashion, surface 206 is a surface of membrane 212, which is separated from mirror layer 208 by stand-offs 214. In some prior-art interferometers, membrane 212 is disposed on a second substrate that is suitable for enabling input beam 104 to reach optically resonant cavity 202. Fabry-Perot interferometer 200 is described in more detail in U.S. patent application Ser. No. 11/366,730, filed 2 Mar. 2006, which is incorporated by reference herein.

Since one surface of Fabry-Perot interferometer 200 is located on a movable membrane that is suitable for motion in response to incident acoustic energy, the cavity length of Fabry-Perot interferometer 200 is a function of received acoustic energy. As a result, the ratio of optical energy in reflected beam 110 and transmitted beam 114 is a function received acoustic energy.

Figure 3:
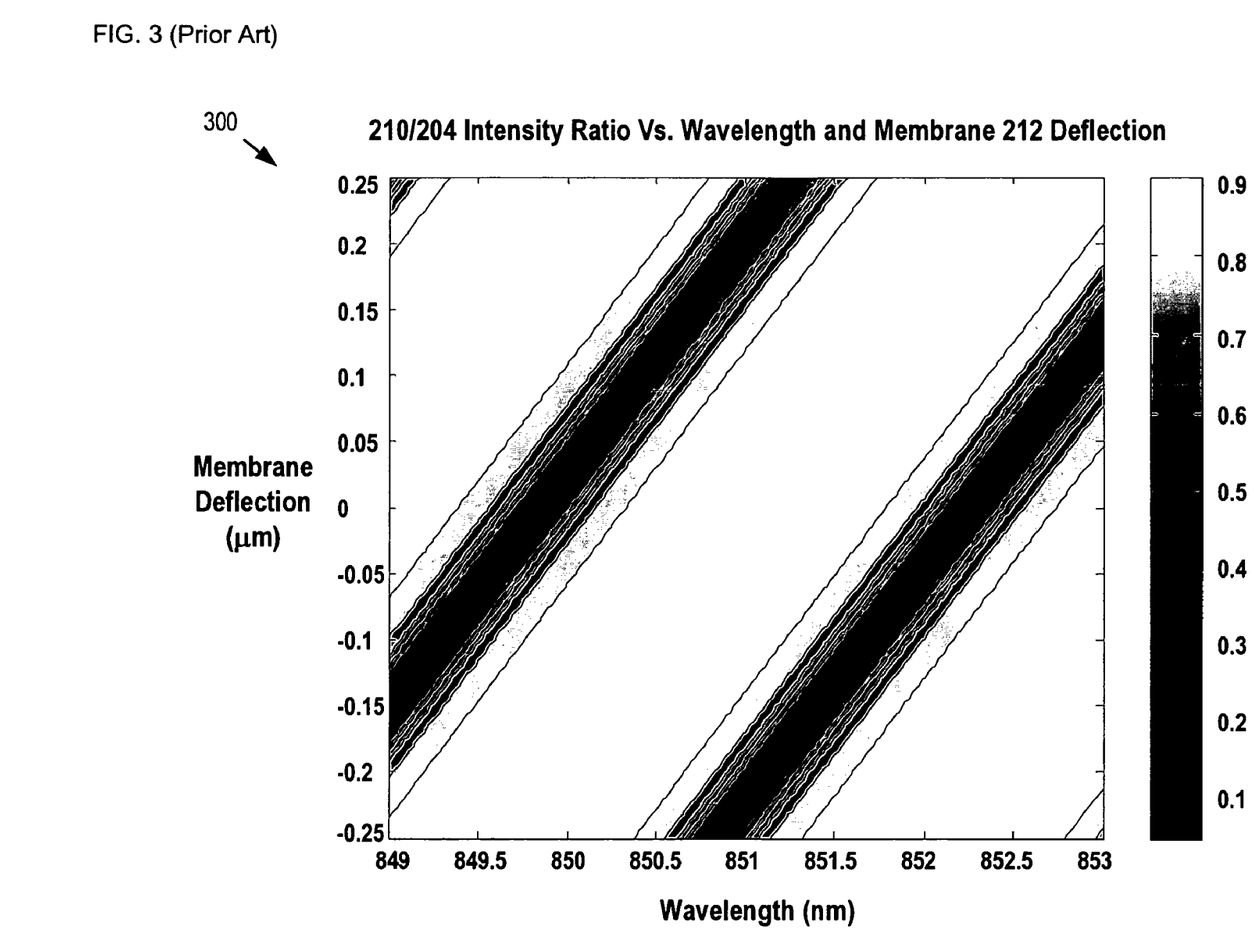
FIG. 3 depicts a plot of the reflection response of prior-art Fabry-Perot interferometer 200 as a function of membrane deflection and input wavelength.

FIG. 3 depicts a plot of the reflection response of prior-art Fabry-Perot interferometer 200 as a function of membrane deflection and input wavelength. Chart 300 depicts the ratio of the intensity of reflected beam 110 to the intensity of input beam 104.

In a conventional Fabry-Perot device, such as Fabry-Perot interferometer 200, wavelength sensitivity is proportional to mechanical sensitivity (i.e., a change in cavity length). As such, it is difficult to determine whether a change in the response of Fabry-Perot interferometer 200 is due to input acoustic energy or noise caused by wavelength fluctuation in source 102. The intensity of transmitted beam 114 to the intensity of input beam 104 is simply the inverse of that shown in plot 300. As a result, even detection of both reflected beam 110 and transmitted beam 114 does not markedly improve the ability to differentiate wavelength noise from displacement of membrane 212.

Figure 4:
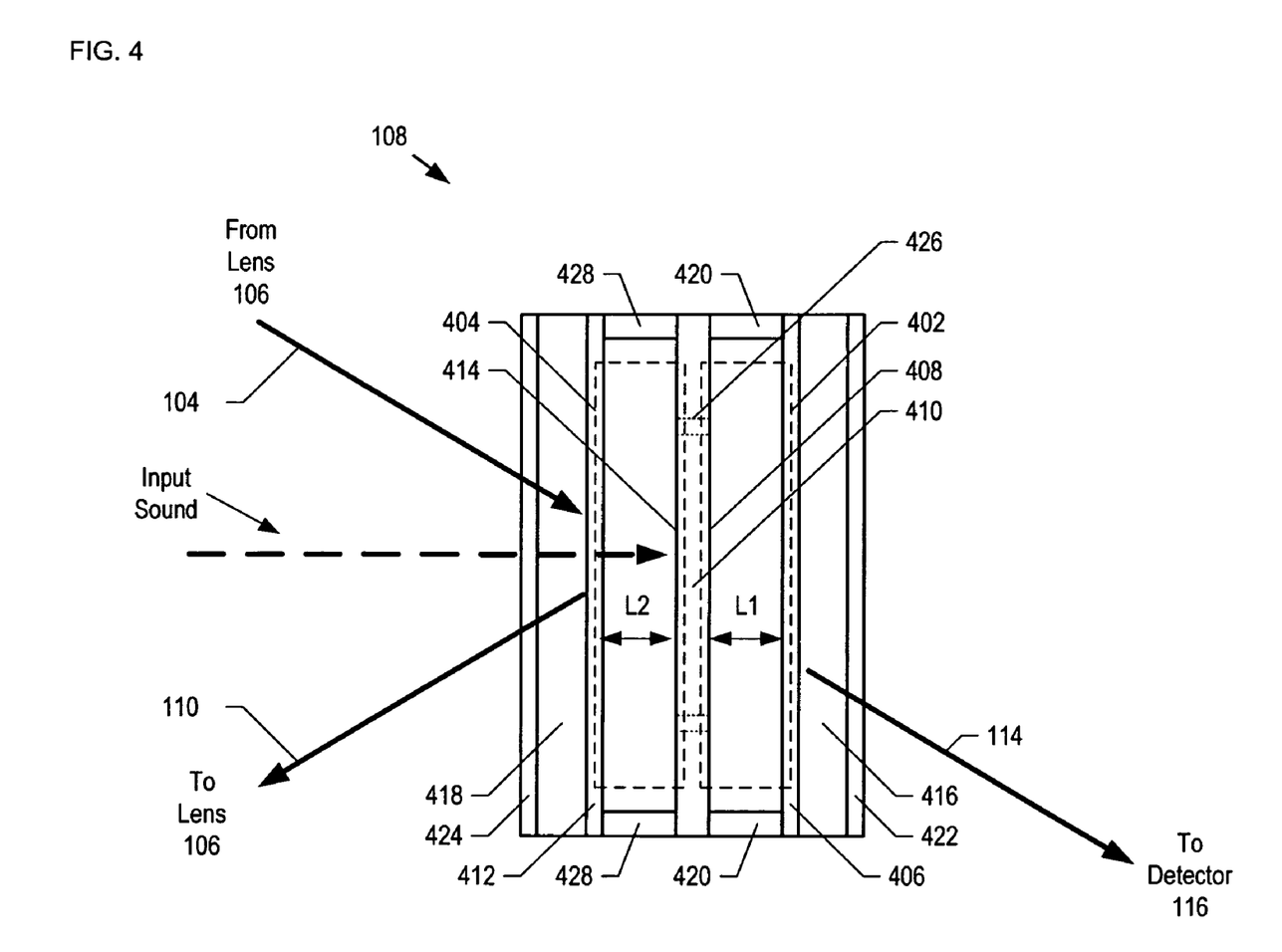
FIG. 4 depicts a cross-sectional view of details of a beam splitter in accordance with the illustrative embodiment of the present invention.

FIG. 4 depicts a cross-sectional view of details of a beam splitter in accordance with the illustrative embodiment of the present invention. Beam splitter 108 comprises mirror 406, mirror 412, membrane 410, substrate 416, substrate 418, anti-reflection layer 422, anti-reflection layer 424, and spacers 420 and 428.

Beam splitter 108 is defined by optically resonant cavity 402 having cavity length L1 and optically resonant cavity 404 having cavity length L2. Optically resonant cavities 402 and 404 are mechanically coupled such that a decrease in one cavity length leads to a commensurate increase in the other cavity length. In other words, the sum of L1+L2 is substantially constant.

Optically resonant cavity 402 comprises mirror 406 and surface 408 of membrane 410. Mirror 406 and surface 408 are partially reflective for light contained in input beam 104. In similar fashion, optically resonant cavity 404 comprises mirror 412 and surface 414 of membrane 410. Mirror 412 and surface 414 are partially reflective for the light contained in input beam 104.

Substrates 416 and 418 are each a 500 micron-thick silicon wafer. Substrate 416 provides a mechanical platform for mirror 406. Substrates 416 and 418 are each substantially transparent for light contained in input beam 104. As a result, substrates 416 and 418 exhibit insubstantial absorption of optical energy. In some embodiments of the present invention, substrates 416 and 418 comprise a material other than silicon. Suitable materials for substrates 416 and 418 include, without limitation, glass, III-V compound semiconductors, II-VI compound semiconductors, ceramics, metal alloys and germanium. In some embodiments of the present invention, one or both of substrates 416 and 418 includes an access hole to further reduce absorption of optical energy. In some embodiments of the present invention, the thicknesses of substrates 416 and 418 are different.

Mirrors 406 and 412 are each a layer of material that is partially reflectivity for a wavelength of light contained in optical beam 104. Mirrors 406 and 412 exhibit reflectivities within the range of approximately 25% to approximately 99%. In the illustrative embodiment, mirrors 406 and 412 are each approximately $n*\lambda/4$-thick, where $\lambda$ is the wavelength (within mirrors 406 and 412) of light provided by source 102 and n is an odd-integer. In some embodiments of the present invention, at least one of mirrors 406 and 412 comprises a 100 nm-thick layer of silicon-rich silicon nitride (SiRN). The thickness of mirrors 406 and 412 is determined so as to provide suitable performance of beam splitter 108 for the wavelength of light provided by source 102.

It will be appreciated by those skilled in the art that the distribution of optical energy into the reflected beam and transmitted beam is dependent upon the thickness and index of refraction of each of mirrors 406 and 412. In addition, it will be appreciated by those skilled in the art that thicknesses of mirrors 406 and 412 other than $\lambda/4$ can provide suitable performance, such as any odd-order of $\lambda/4$ (e.g., $3\lambda/4$, $5\lambda/4$, etc.). In some embodiments of the present invention, (e.g., wherein a different ratio of transmitted light to reflected light or different mechanical characteristics for layer 304 are desired) the thickness of at least one of mirrors 406 and 412 is approximately an even-order of $n*\lambda/4$ (e.g., $\lambda/2$, $\lambda$, $3\lambda/2$, etc.), and n is an even-integer.

In some embodiments of the present invention, the thickness of at least one of mirrors 406 and 412 is made different than any order of $n*\lambda/4$ to reduce its reflectivity. It is recognized by the inventors that by reducing the reflectivity of mirrors 406 and 412, an improved depth of modulation can be achieved at operating points that exhibit low wavelength sensitivity.

Membrane 410 is a layer of material that is translucent at the wavelength of light provided by source 102. The thickness of membrane 410 is approximately $\lambda/4$, where $\lambda$ is a wavelength (within membrane 410) of light provided by source 102. Membrane 410 comprises surfaces 408 and 414, each of which composes one surface of an optically-resonant cavity. Membrane 410 comprises through-holes 426 to facilitate response of beam splitter 108 to changes in pressure (e.g., in order to provide or avoid mechanical damping effects, etc.).

In the illustrative embodiment of the present invention, membrane 410 comprises a 100 nm-thick layer of silicon-rich silicon nitride (SiRN). The thickness of membrane 410 is determined so as to enable the desired ratio of reflectivity to transmissivity for beam splitter 108 for the wavelength of light provided by source 102. It will be appreciated by those skilled in the art that other thicknesses of membrane 410 can be used, such as any odd-order of $n*\lambda/4$, where n is an odd-integer (e.g., $3\lambda/4$, $5\lambda/4$, etc.). In some embodiments of the present invention, wherein it is desirable to substantially invert the ratio of reflectivity to transmissivity (from that of the illustrative embodiment), the thickness of membrane 410 is approximately an order of $n*\lambda/2$, where n is an integer (e.g., $\lambda/2$, $\lambda$, $3\lambda/2$, etc.). In still some other embodiments of the present invention, the thickness of membrane 410 is made different than any order of $n*\lambda/4$.

Although the illustrative embodiment comprises a membrane that comprises a layer of SiRN, it will be clear to one of ordinary skill in the art, after reading this specification, how to make and use alternative embodiments of the present invention wherein membrane 410 comprises a layer of material other than SiRN. Suitable materials for use in membrane 410 include, without limitation, silicon containing materials (e.g., silicon nitride, silicon dioxide, polysilicon, silicon compounds, etc.), nitrocellulose, plastics (e.g., Mylar, polyester, etc.), polyimides, and ceramics.

Since, in some embodiments of the present invention, both reflected beam 110 and transmitted beam 114 are detected, greater tolerance to layer thickness variation is gained. In some embodiments of the present invention, therefore, the thicknesses of mirrors 406 and 412 and membrane 410 can be substantially different than an even or odd order of $\lambda/4$. In some embodiments, the thickness of at least one of mirrors 406 and 412 is different than the thickness of membrane 410.

In some embodiments of the present invention, at least one of mirrors 406 and 412 and membrane 410 comprises a material other than SiRN. In still some other embodiments of the present invention, at least one of mirrors 406 and 412 and membrane 410 comprises a plurality of layers of different materials. Suitable materials for use in mirrors 406 and 412 and membrane 410 include, without limitation, silicon, silicon dioxide, silicon oxide (SiOx, where x is in the range of 0.1 to 4), titanium nitride, polysilicon, stoichiometric silicon nitride ($Si_3N_4$), III-V compound semiconductors, and II-VI compound semiconductors.

Anti-reflection layers 422 and 424 are layers for reducing the reflection of optical energy at the interfaces between substrates 415 and 418 and their adjacent media. It will be clear to one of ordinary skill in the art how to make and use anti-reflection layers 422 and 424.

In some embodiments, through-holes are provided through the layer stack comprising anti-reflection layer 424, substrate 418, and mirror 412. These through-holes provide access to membrane 410 for an environmental stimulus (e.g., acoustic energy, pressure, radiation, etc.). In some embodiments, this layer stack is otherwise patterned to provide access to membrane 410 for the environmental stimulus. In some embodiments, access to membrane 410 is also provided through the layer stack comprising anti-reflection layer 422, substrate 416, and mirror 406.

Spacers 420 and 428 are precision ceramic spacers that have a thickness within the range of approximately 10 microns to approximately 2000 microns. In the illustrative embodiment, spacers 420 have a thickness of approximately 150 microns and spacers 428 have a thickness of approximately 125 microns. In some alternative embodiments, spacers 420 and 428 are chosen to provide optically resonant cavities having substantially equal cavity lengths; therefore spacers 420 and 428 each have substantially the same thickness. In some alternative embodiments, spacers 420 and 428 have different thicknesses. For example, in some embodiments, spacers 420 have a thickness of approximately 75 microns and spacers 428 have a thickness of approximately 150 microns. In still some other embodiments, spacers 420 have a thickness of approximately 300 microns and spacers 428 have a thickness of approximately 150 microns. The thickness of spacers 420 is selected to provide a desired performance of beam splitter 108 for the wavelength of light provided by source 102.

In some embodiments of the present invention, spacers 420 and 428 comprise silicon, and are formed by etching away silicon wafers that interpose mirror 406 and membrane 410 and mirror 412 and membrane 410. In still some other embodiments, at least some of spacers 420 and 428 comprise a material other than ceramic or silicon. Suitable materials for spacers 420 and 428 include, without limitation, metals, epoxies, solder, silicon dioxide, glass, alumina, III-V compound semiconductors, and II-VI compound semiconductors. It will be clear to those skilled in the art, after reading this specification, how to make and use alternative embodiments of the present invention that comprises spacers that have any suitable thickness.

Mirror 406 and surface 408 collectively define optically resonant cavity 402 that has a cavity length L1. Mirror 412 and surface 414 collectively define optically resonant cavity 404 that has a cavity length L2. Since surfaces 408 and 414 reside on membrane 410, which is movable in response to input sound, optically resonant cavities 402 and 404 are mechanically coupled. As a result, cavity lengths L1 and L2 are functions of the input sound.

Since membrane 410 is a part of both optical cavities, optical cavities 402 and 404 are optically coupled. The optical energy in reflected beam 106 and transmitted beam 114 is a function of the optically coupled behavior of optical cavities 402 and 404. In the absence of a pressure differential across the thickness of membrane 410, cavity length L1 is equal to the thickness of spacers 420 and cavity length L2 is equal to the thickness of spacers 428. In the presence of a pressure differential (e.g., due to incident acoustic energy) across its thickness, however, membrane 410 moves and thereby changes cavity lengths L1 and L2.

Although the illustrative embodiment of the present invention comprises a beam splitter that provides a reflected beam and a transmitted beam that transits the cavities of the beam splitter only one time, in some alternative embodiments of the present invention the transmitted beam is reflected back through the beam splitter a second time. In these embodiments, therefore, detectors 112 and 116 are located on the same side of the beam splitter. Optical configurations suitable for such operation are disclosed in more detail in U.S. patent application Ser. No. 11/421,593, filed 22 Mar. 2007, which is incorporated by reference herein.

Figure 5A:
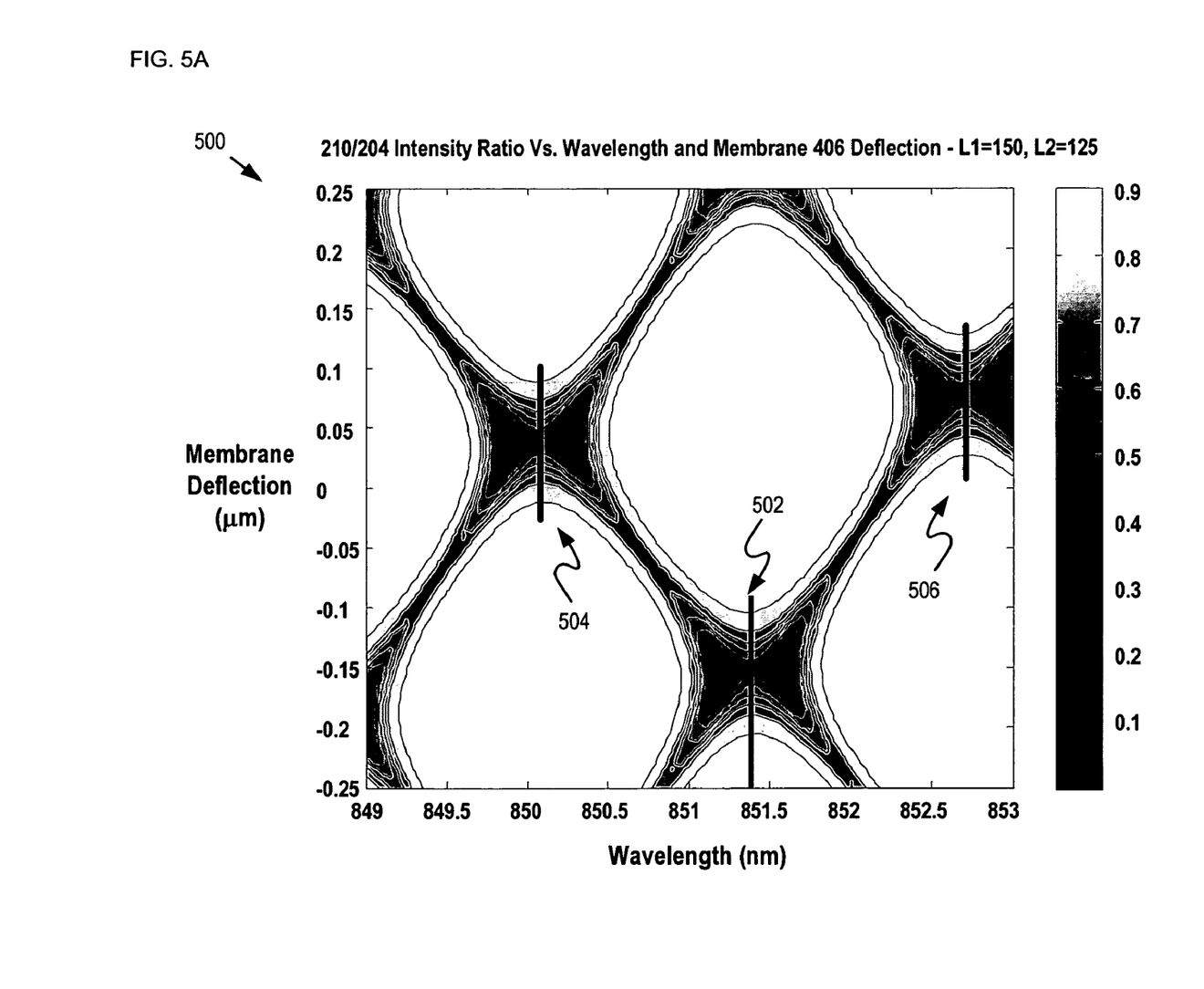
FIG. 5A depicts a plot of the reflection response of beam splitter 108 as a function of membrane deflection and input wavelength in accordance with the illustrative embodiment of the present invention.

FIG. 5A depicts a plot of the reflection response of beam splitter 108 as a function of membrane deflection and input wavelength in accordance with the illustrative embodiment of the present invention. Plot 500 depicts the ratio of the intensity of reflected beam 110 to the intensity of input beam 104 for optically coupled optically resonant cavities 402 and 404, wherein cavity length L1 is equal to approximately 150 microns and cavity length L2 is equal to approximately 125 microns.

The presence of the second optically resonant cavity provides an optical response that has a strong displacement response at operating point 502 (i.e., wavelength of approximately 851.4 nm) with little wavelength sensitivity. In addition, the optically coupled cavities provide for multiple operating points, such as operating points 504 and 506.

Figure 5B:
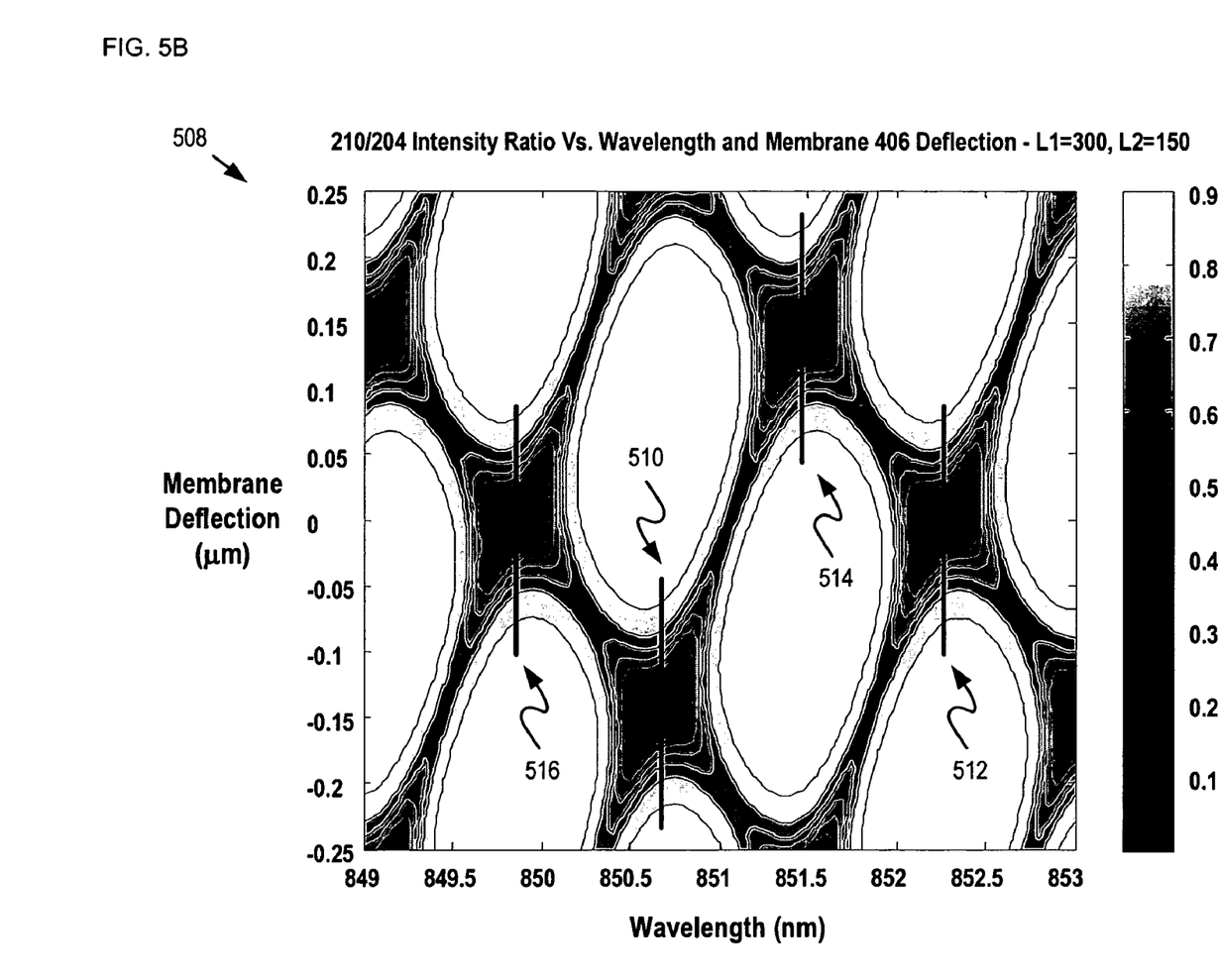
FIG. 5B depicts a plot of the reflection response of beam splitter 108 as a function of membrane deflection and input wavelength in accordance with an alternative embodiment of the present invention.

FIG. 5B depicts a plot of the reflection response of beam splitter 108 as a function of membrane deflection and input wavelength in accordance with an alternative embodiment of the present invention. Plot 508 depicts the ratio of the intensity of reflected beam 110 to the intensity of input beam 104 for optically coupled optically resonant cavities 402 and 404, wherein cavity length L1 is equal to approximately 300 microns and cavity length L2 is equal to approximately 150 microns. In addition, mirrors 406 and 412 have reduced reflectivity from that of the illustrative embodiment. Plot 508 demonstrates that optically coupled optically resonant cavities with severely unbalanced cavity lengths, coupled with reduced reflectivity mirrors, enables beam splitter operation with high depth of modulation at any of operating points 510, 512, 514, and 516. Each of these operating points exhibits low wavelength sensitivity.

Figure 6:
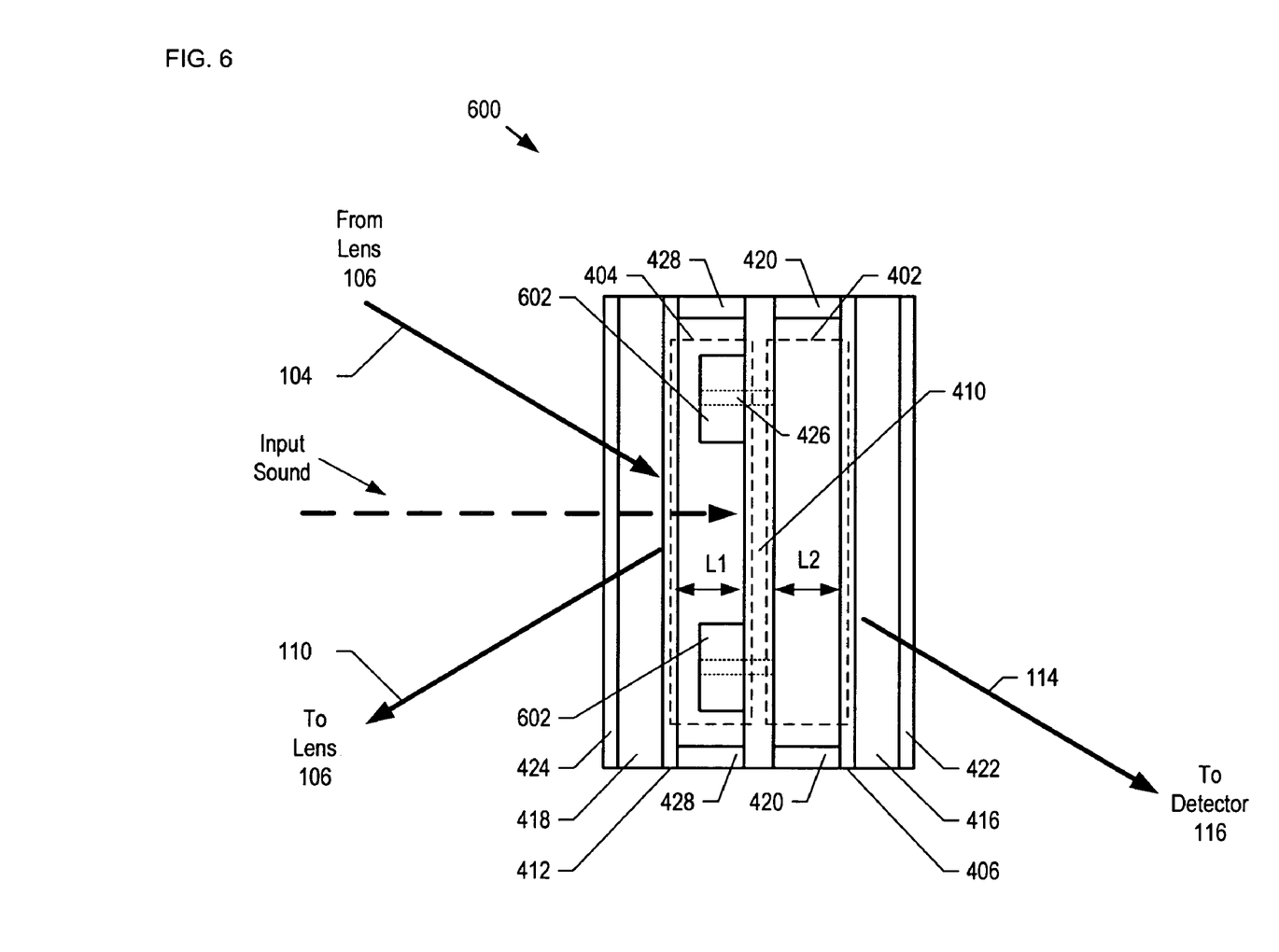
FIG. 6 depicts a cross-sectional view of details of a beam splitter for sensing mechanical energy in accordance with an alternative embodiment of the present invention.

FIG. 6 depicts a cross-sectional view of details of a beam splitter for sensing mechanical energy in accordance with an alternative embodiment of the present invention. Beam splitter 600 comprises optically resonant cavities 402 and 404, which are mechanically and optically coupled via membrane 410.

Beam splitter 600 is analogous to beam splitter 400, but beam splitter 600 has greater sensitivity to mechanical energy by virtue of proof mass 602. Proof mass 602 is an annular ring of polycrystalline silicon that enhances the affect of coupled mechanical energy on membrane 410 (e.g., accelerations due to shock, vibration, motion, etc.). Since proof mass 602 is disposed over through holes 426, these holes extend through the proof mass as well. Although proof mass 602 is an annular ring of polysilicon, it will be clear to those of ordinary skill in the art how to make and use proof masses of any shape and that comprise materials other than polycrystalline silicon. Suitable materials for proof mass 602 includes, without limitation, metals, ceramics, dielectrics, semiconductor compounds, and organic materials such as polyimides, plastics, photoresists, and the like.

Figure 7:
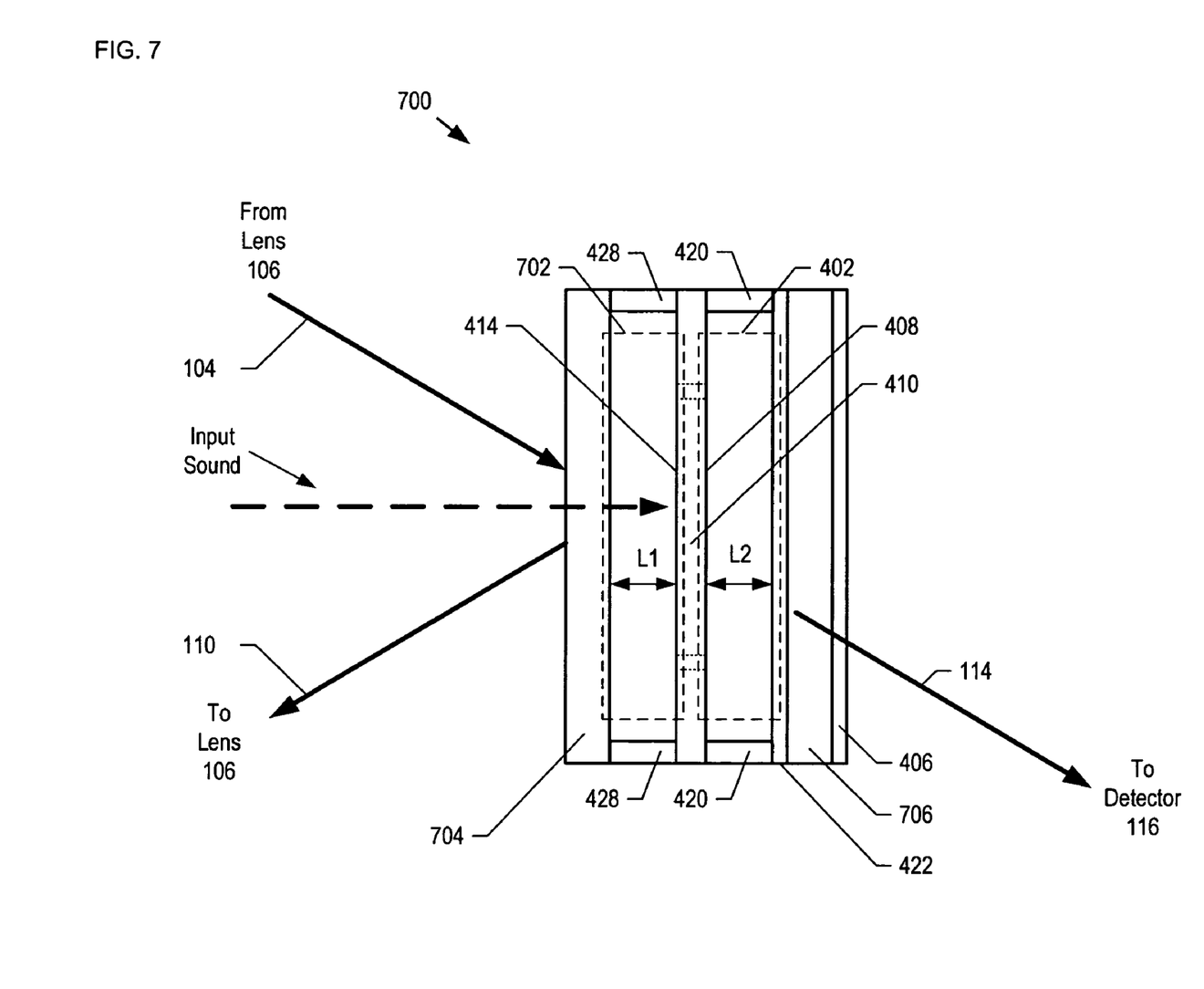
FIG. 7 depicts a cross-sectional diagram of details of a beam splitter in accordance with another alternative embodiment of the present invention.

FIG. 7 depicts a cross-sectional diagram of details of a beam splitter in accordance with another alternative embodiment of the present invention. Beam splitter 700 comprises optically resonant cavities 702 and 704, which are mechanically and optically coupled via membrane 410.

Beam splitter 700 is analogous to beam splitter 400; however, (1) beam splitter 700 is formed on a single silicon substrate (i.e., substrate 706), and (2) beam splitter 700 comprises an optically resonant cavity (i.e., optically resonant cavity 702) that includes the thickness of a substantially transmissive substrate 706.

Optically resonant cavity 702 is defined by mirror 406 and surface 408 of membrane 410. Mirror 406 is formed on the surface of substrate 706 that is distal to membrane 410, while anti-reflection coating 422 is formed on the surface of substrate 706 that is proximate to membrane 410. The thickness of substrate 706 is approximately an even order of $n\lambda/4$, so that it does not substantially adversely affect transmission of optical energy through its thickness.

Optically resonant cavity 704 is defined by mirror 706 and surface 414 of membrane 410. Mirror 706 is analogous to mirror 424. During fabrication of beam splitter 700, however, spacers 428 and mirror 706 are formed via successive well-known thin-film deposition and conventional subtractive patterning operations. It will be clear to one of ordinary skill in the art, after reading this specification, how to make and use mirror 706 and spacers 428.

In some embodiments, optically resonant cavity 702 is mechanically and optically coupled with optically resonant cavity 404, in similar fashion to that depicted in FIG. 4. Providing at least one optically resonant cavity that is analogous to optically resonant cavity 702 affords added flexibility in both system design and beam splitter fabrication.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising an optical element for receiving an input of optical energy and distributing the optical energy into a first output and a second output, wherein the optical element comprises;
   (a) a first surface;
   (b) a second surface; and
   (c) a movable membrane, wherein the movable membrane interposes the first surface and the second surface;
   wherein the first surface and the membrane are substantially parallel and form a first optically resonant cavity having a first cavity length, and wherein the first cavity length varies in response to an environmental stimulus;
   wherein the second surface and the membrane are substantially parallel and form a second optically resonant cavity having a second cavity length, and wherein the second cavity length varies in response to the environmental stimulus; and
   wherein the ratio of optical energy in the first output to the optical energy in the second output is a function of the first cavity length and the second cavity length.

2. The apparatus of claim 1 further comprising a first photodetector for providing a first electrical signal based on the optical energy in the first output.

3. The apparatus of claim 2 further comprising:
   a second photodetector for providing a second electrical signal based on the optical energy in the second output; and
   a processor for receiving the first electrical signal and the second electrical signal and providing a composite output signal based on the first electrical signal and the second electrical signal.

4. The apparatus of claim 3 wherein the optical element interposes the first photodetector and the second photodetector.

5. The apparatus of claim 3 wherein the first photodetector and the second photodetector are disposed on the same side of the optical element, and wherein the first output is a beam of optical energy that is reflected from the optical element, and further wherein the second output is a beam of optical energy that transits at least one of the first cavity and the second cavity.

6. The apparatus of claim 1 further comprising a substrate that is at least partially transmissive to the optical energy, wherein the substrate comprises the first surface and a third surface, and wherein the first surface is proximate to the membrane and the third surface is distal to the membrane and further wherein the third surface comprises a mirror that is at least partially reflective for the optical energy.

7. The apparatus of claim 6 wherein the first surface is substantially anti-reflective for the optical energy.

8. The apparatus of claim 1 wherein the environmental stimulus is selected from the group consisting of acoustic energy, pressure, and acceleration.

9. The apparatus of claim 1 wherein the optical element further comprises a proof mass, wherein the proof mass and the movable membrane are mechanically coupled.

10. An optical displacement sensor comprising:
(1) a source of input light, wherein the input light is characterized by a first wavelength;
(2) an optical element for receiving the input light and distributing it into a first optical output and a second optical output, wherein the ratio of the first optical output to the second optical output is a function of an environmental stimulus, and wherein the optical element comprises;
    (a) a first optical cavity that is optically resonant at the first wavelength, wherein said first optical cavity has a first cavity length that is a function of the environmental stimulus; and
    (b) a second optical cavity that is optically resonant at the first wavelength, wherein said second optical cavity has a second cavity length that is a function of the environmental stimulus;
    wherein the first optical cavity and the second optical cavity are mechanically coupled such that the sum of the first cavity length and the second cavity length is substantially constant; and
(3) a first photodetector for providing a first electrical output based on one of the first optical output and the second optical output.

11. The apparatus of claim 10 further comprising:
(4) a second photodetector for providing a second electrical output based on the other one of the first optical output and the second optical output; and
(5) a processor for receiving the first electrical output and the second electrical output and providing a third electrical output based on the first electrical output and the second electrical output.

12. The apparatus of claim 10 wherein the environmental stimulus is selected from the group consisting of acoustic energy, pressure, and acceleration, and nuclear energy.

13. The apparatus of claim 10 wherein the optical element further comprises (c) a first substrate, wherein the first substrate comprises a first surface and a membrane that is physically-adapted to move in response to the environmental stimulus, and wherein the first surface and the membrane collectively define the first optical cavity.

14. The apparatus of claim 13 wherein the optical element further comprises (d) a second surface, wherein the membrane interposes the first surface and the second surface, and wherein the second surface and the membrane collectively define the second optical cavity.

15. The apparatus of claim 13 wherein the optical element further comprises (d) a second substrate, wherein the second substrate comprises a second surface, and wherein the second surface and the membrane collectively define the second optical cavity.

16. The apparatus of claim 13 wherein the first substrate further comprises a second surface, and wherein the first substrate is at least partially transmissive for light characterized by the first wavelength, and wherein the first surface is proximate to the membrane and the second surface is distal to the membrane, and further wherein the second surface comprises a first mirror that is at least partially reflective for light characterized by the first wavelength.

17. The apparatus of claim 16 wherein the first surface is substantially anti-reflective for light characterized by the first wavelength.

* * * * *